June 17, 1924.
W. H. LANCASTER
1,498,458
VEHICLE OPERATED GATE
Filed Nov. 15, 1921      3 Sheets-Sheet 1
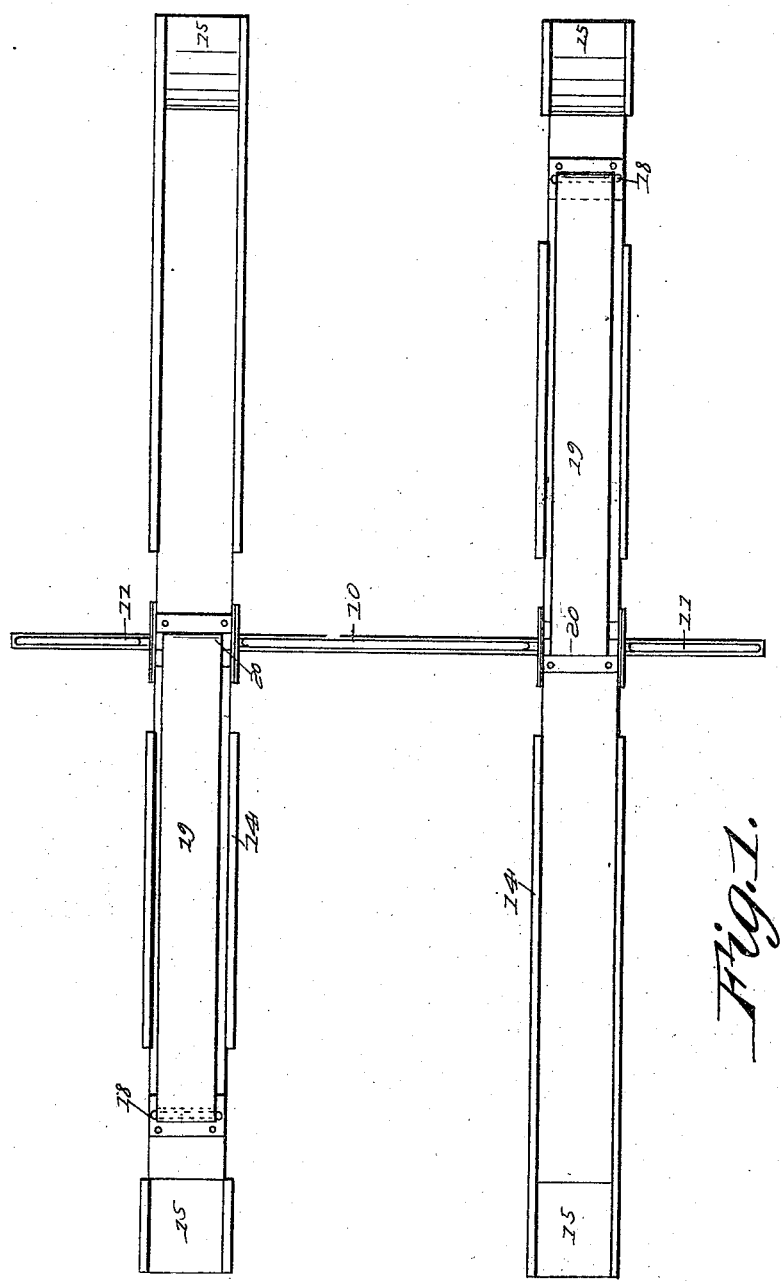

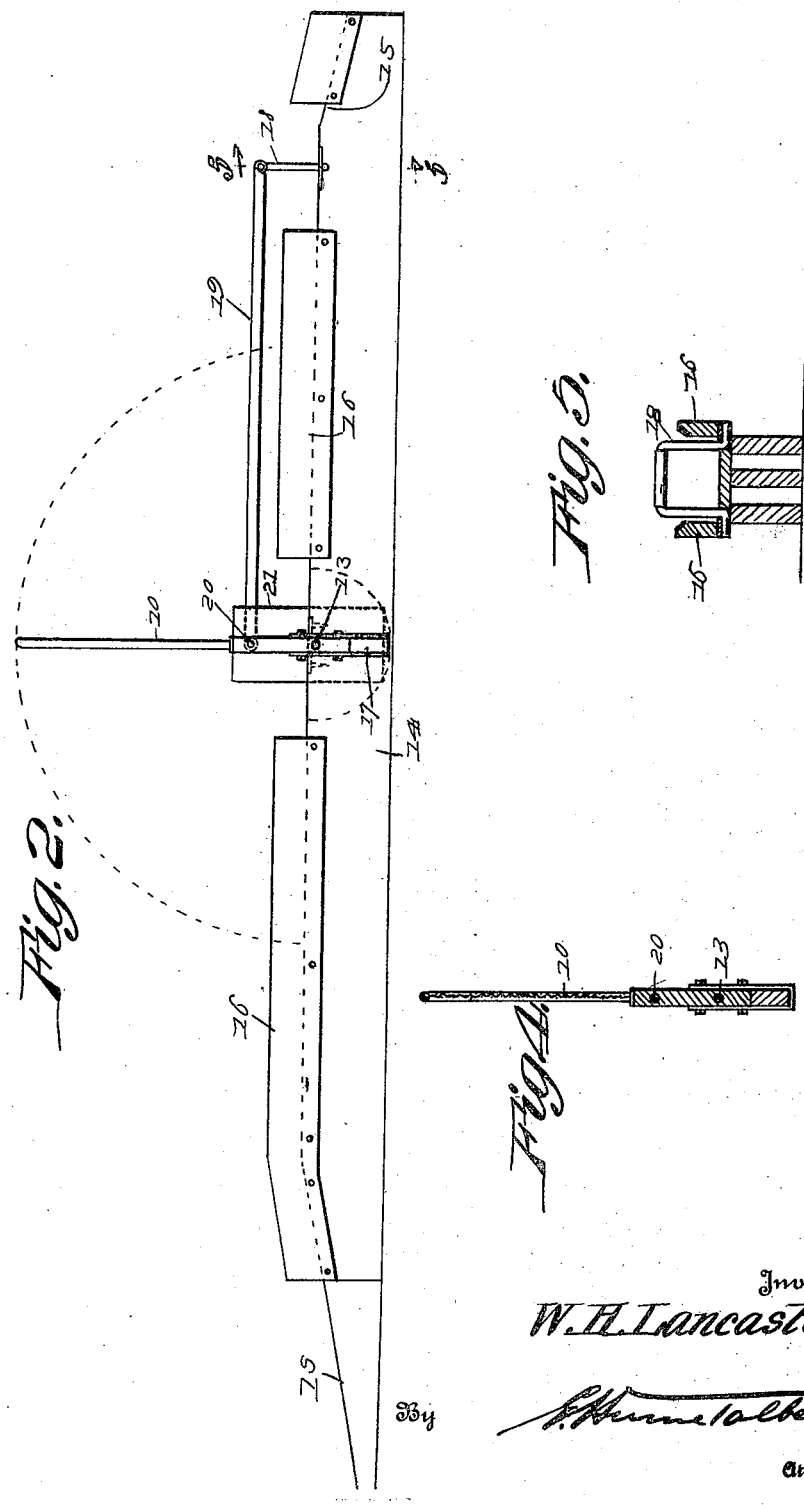

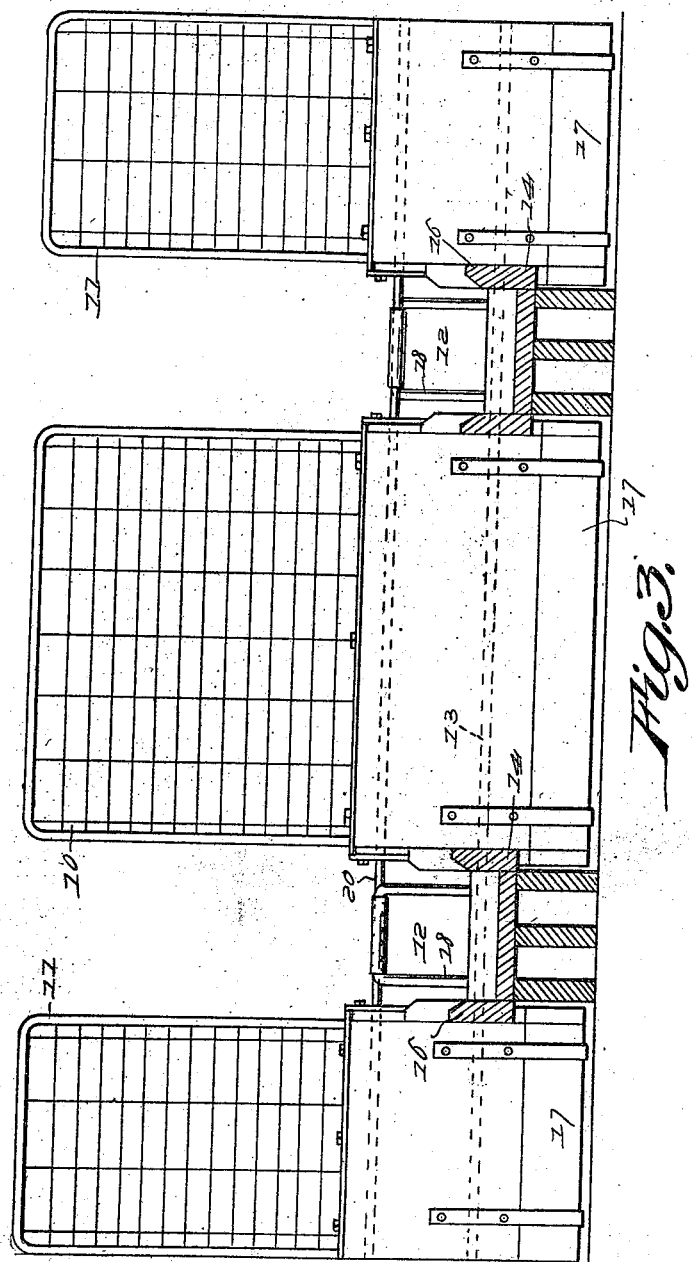

Patented June 17, 1924.

1,498,458

UNITED STATES PATENT OFFICE.

WILLIAM H. LANCASTER, OF BELLE FOURCHE, SOUTH DAKOTA.

VEHICLE-OPERATED GATE.

Application filed November 15, 1921. Serial No. 515,289.

*To all whom it may concern:*

Be it known that WILLIAM H. LANCASTER, a citizen of the United States of America, residing at Belle Fourche, in the county of Butte and State of South Dakota, has invented new and useful Improvements in Vehicle-Operated Gates, of which the following is a specification.

The object of the invention is to provide a simple and efficient construction of gate adapted for use in connection with farm lands, pastures and like enclosures which for convenience must be readily accessible to pedestrians and vehicles while being protected against the invasion or the escape of stock; and more particularly to provide a gate of this general type which may readily be opened and closed by the movement of a vehicle in approaching and leaving the same to the end that the inconvenience to the driver or occupant of the vehicle of dismounting to open and close the gate may be avoided while insuring the permanent closed position of the gate except when opened to permit of the passage of a vehicle; and with this object in view the invention consists in a construction and combination of parts of which a preferred embodiment is shown in the accompanying drawings, wherein:—

Figure 1 is a plan view of a gate and operating mechanism constructed in accordance with the invention.

Figure 2 is a side view of the same.

Figure 3 is a front elevational view the approaches being shown in section.

Figure 4 is a detail vertical sectional view of one of the gate members and its immediate connections.

Figure 5 is a detail sectional view on the plane indicated by the line 5—5 of Figure 2.

The gate is of the vertical swinging type adapted to fold into a horizontal position to permit of the passage of a vehicle and to this end it consists of an intermediate member 10 and side members 11 spaced apart to form intervals sufficient to permit of the passage of the wheels of a vehicle and to operate on opposite sides of the wheel guides 12 which are arranged in the said intervals, the gate members being carried by a common pivot rod 13 extending transversely of the roadway and supported by a suitable frame work including the longitudinal beams 14 which serve to maintain the wheel guides at a slight elevation from the surface of the ground, the wheel guides being accessible by means of approaches 15 which may be of earth filled in and properly positioned to lead to said guides. At the sides of the wheel guides are lateral guards 16 to prevent lateral displacement of the wheels in traversing the same, and carried by the gate members below the horizontal plane of the pivot rod 13 are counterbalancing weights 17 or any equivalent thereof serving to normally and yieldingly maintain the gate members in an upright or closed position as indicated in Figure 2.

Arranged in alignment with the wheel guides, respectively at opposite sides of the plane of the gate are the wheel trips 18 consisting of looped rods disposed in the path of one of the front wheels of a vehicle approaching the gate from either direction and connected by a tread 19 with a rod 20 extending longitudinally of the gate members above the plane of the pivot rod 13, so that as a vehicle approaches the gate from either direction the front wheel at one side thereof comes in contact with the trip the latter is swung forward or toward the gate and thereby through the tread bar swings the gate in a corresponding direction, to a vehicle receiving position, the gate members occupying the positions between the wheel guides and hence not being subject to contact with the vehicle or any of the parts thereof. Obviously as the vehicle progresses inwardly over the gate the front wheel at the opposite side from that which has actuated the trip, by coming in contact with and bearing upon the tread member at the opposite side of the gate serves to hold the latter in the folded or open position until the vehicle has passed entirely through the gate opening and has released the second tread member whereupon the gate by its counterweights will be returned to the normal or closed position.

It will further be obvious from the foregoing description that the gate is adapted to swing in either direction to open position and therefore is actuable by the approach of a vehicle from either direction and always swings away from the approaching vehicle and is held in the open position until the vehicle has passed beyond the range of movement of the gate.

The lateral guards 16 terminate adjacent the pivot point of the gate and leave a space between their adjacent extremities but the gate members carry side plates 21 which, when the gate is depressed, swing into horizontal positions and close the space between the lateral guards and thus provide means for keeping the wheels in the wheel guides as they pass over the pivot point of the gate.

Having described the invention, what is claimed as new and useful is:—

A gate consisting of intermediate and side members spaced apart to form intervals sufficient to permit the passage of the wheels of a vehicle, wheel guides disposed in said intervals and provided with approaches, trips disposed in said guides and consisting of looped rods mounted for pivotal movement with their pivot points in the plane of the pivot point of the gate members, transverse rod spanning said intermediate and side members of the gate, and tread plates carried by said trip members and said transverse rod for depression toward but in parallelism with the bottoms of said wheel guides, said wheel guides being provided with lateral guards terminating short of the pivot point of the gate members, and the gate members adjacent the guides being provided with plates swinging into the plane of said lateral guards on the depression of the gates to close the spaces between the ends of said guards.

In testimony whereof he affixes his signature.

WILLIAM H. LANCASTER.